Patented Dec. 8, 1942

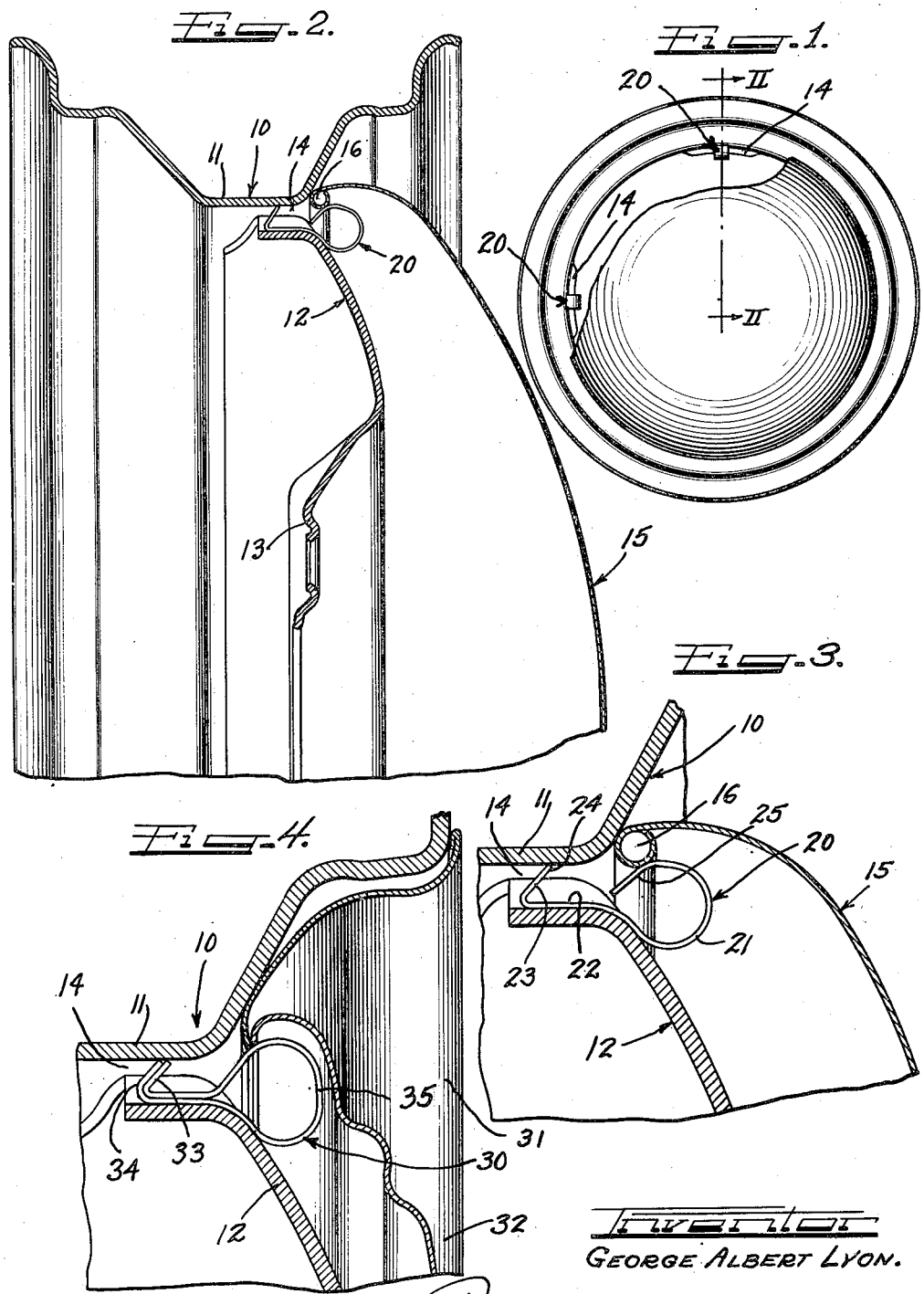

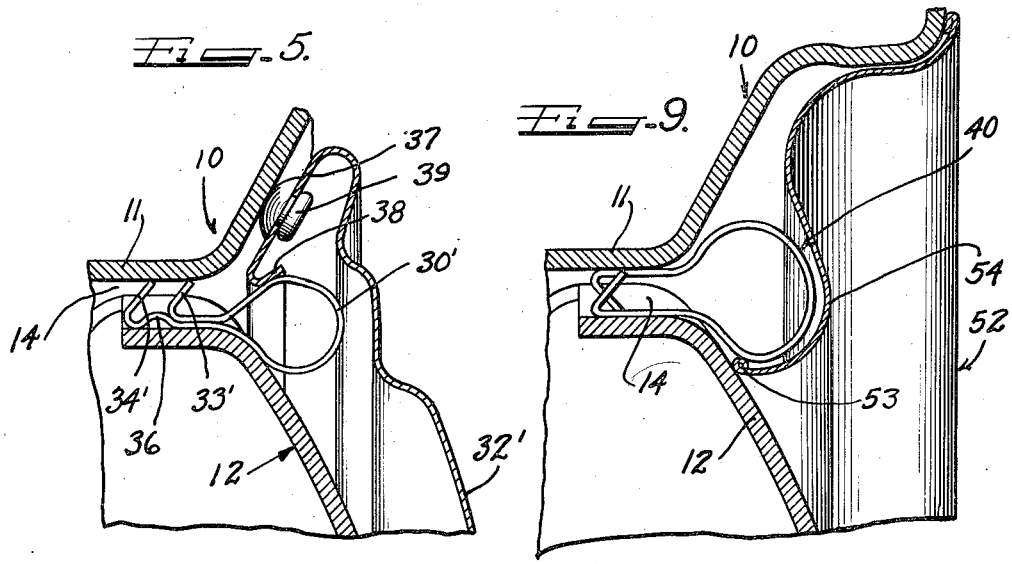
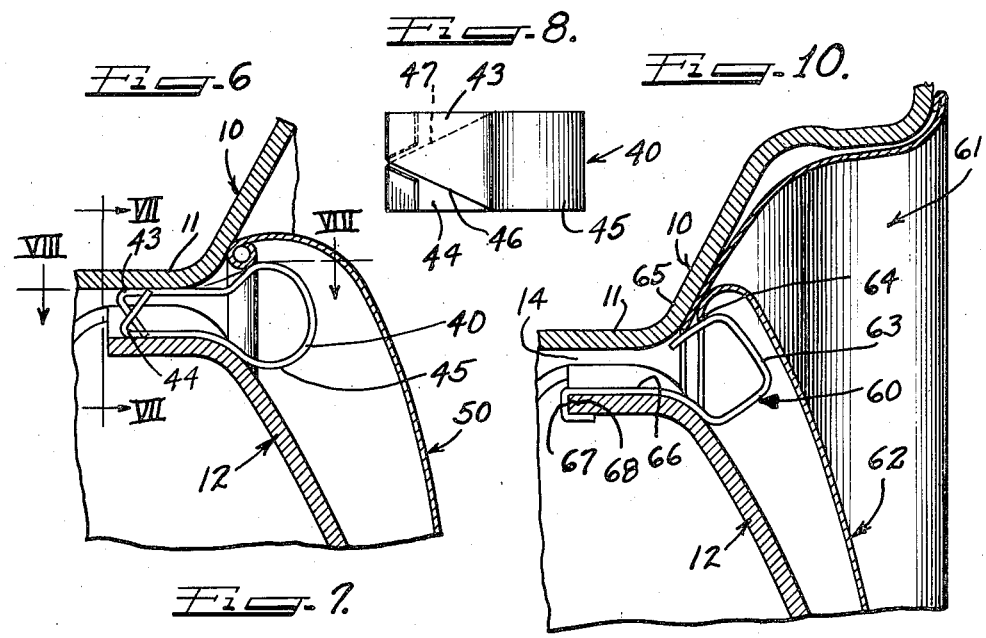
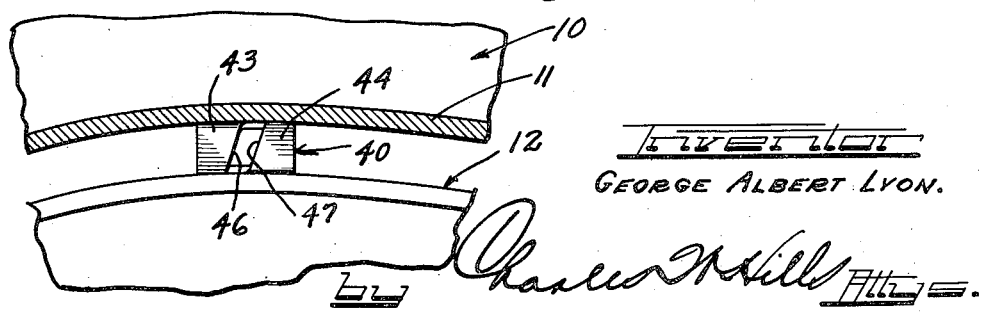

2,304,583

UNITED STATES PATENT OFFICE 2,304,583

WHEEL STRUCTURE

George Albert Lyon, Allenhurst, N. J.

Application January 21, 1941, Serial No. 375,172

6 Claims. (Cl. 301—37)

This invention relates to a wheel structure, and more particularly to one wherein there is provided novel snap-on cover retaining spring clips.

An object of this invention is to provide in a wheel structure cover retaining spring clips which may be readily snapped into engagement with the parts of the wheel and which do not require any alteration in the wheel structure in order for them to be retained on the wheel.

Another object of this invention is to utilize the spaced openings in a wheel body or spider part as a means for accommodating a plurality of spring clips of such construction that the spring clips may be readily snapped and wedged into retained engagement with the wheel at said openings.

Still another object of this invention is to provide a novel cover retaining spring clip which may be wedged into retained engagement with a wheel at an opening separating the spider or body part of the wheel from the rim part.

In accordance with the general features of this invention, there is provided in a wheel structure rim and body parts connected together at spaced intervals with openings in the body part separating the connections, and in which openings are wedged a plurality of cover retaining spring clips; the cover being retained on the spring clips by merely snapping it over and into yieldable and detachable engagement with free portions of the spring clips.

In accordance with other features of the invention, I have provided a number of different forms of spring clips, one of which only includes a single leg for wedging engagement with one of the spring parts in the opening in the spider part, another of which includes a plurality of legs for wedging engagement with the wheel part, and still another including a portion which hooks over an edge of the spider part at the corresponding opening in the spider part.

Other objects and features of this invention will more fully appear from the following detailed description taken in connection with the accompanying drawings which illustrate a number of embodiments thereof, and in which:

Figure 1 is a side view of a wheel structure embodying the features of this invention, and in which the cover has been broken away in order to show the spring clips;

Figure 2 is an enlarged fragmentary cross sectional view taken on the line II—II of Figure 1;

Figure 3 is an enlarged fragmentary cross sectional view corresponding to the upper right hand portion of Figure 2 and showing clearly the coaction of my novel spring clip with both the wheel and the wheel cover;

Figure 4 is a cross sectional view similar to Figure 3 showing a modified form of spring clip and cover, and wherein the spring clip is utilized to hold two cover members on the wheel, namely, a trim ring and a central hub cap or disk;

Figure 5 is a cross sectional view similar to Figure 4 showing a further modification of the invention wherein the spring clip includes staggered end portions for engaging wedgingly the rim part of the wheel inside of the corresponding opening, and wherein the cover is in the form of a disk or hub cap and has cushioning means for contacting the rim part of the wheel;

Figure 6 is a sectional view similar to Figure 3 with a slightly different modified form of clip wherein the clip is in the form of a closed loop having overlapped ends in engagement with both of the wheel parts inside of the corresponding opening;

Figure 7 is a fragmentary sectional view taken on the line VII—VII of Figure 6 looking in the direction indicated by the arrows and showing the construction of the ends of the spring clips;

Figure 8 is a detailed plan view taken on the line VIII—VIII of Figure 6 showing further the construction of the spring clip;

Figure 9 is a cross sectional view illustrating still another form of the invention wherein the spring clip is utilized to hold a trim ring on the wheel; and Figure 10 is a cross sectional view of a still further form of the invention similar to Figure 4, and wherein the spring clip is hooked over an edge of the body part instead of being wedged into retained engagement.

As shown on the drawings:

The reference character 10 designates generally a multi-flanged drop center type of tire rim which is connected by rivets or welding at spaced intervals through a base flange 11 to a central body part or spider 12, which includes the usual central bolt-on flange 13. The connections between the body part 12 and the rim part 10 are separated by openings 14 in the body part, and it is the object of this invention to utilize those openings in the retention of the cover retaining spring clips on the automobile wheel.

I have, in the first form of the invention shown in Figures 1 to 3 inclusive, designated the spring clips by the reference character 20, and inasmuch as the spring clips are all identical in construction, a description of one will suffice for all. These spring clips are illustrated as retaining in position a disk-like cover member or hub cap 15 having a turned outer edge 16 in retained engagement with the spring clips 20. This cover member may be made from any suitable sheet material such, for example, as stainless steel sheet of .020" in thickness.

The spring clips 20 are made of spring steel and are bent into the form shown in Figure 3. Each of these clips includes a hook-like free yieldable outer end 21, a longitudinal body portion 22 bearing against the spider 12 in one of the openings 14, and a radially and outwardly inclined end 23 having its extremity at 24 in biting engagement with the inner surface of the base flange 11 of the rim part 10. The hook-like end includes a generally radially inclined end 25 over which the turned edge 16 of the cover member 15 is adapted to be pressed or cammed into retained engagement with the clips.

The cover member 15 is easily applied to the wheel by pressing it axially into engagement with the inclined ends 25 of the spring clips 20. Due to the fact that the inclined ends 25 are disposed in a circle of a diameter slightly in excess of the inside diameter of the turned edge 16, it follows that the ends 25 are deflected radially inward as the rolled edge 16 of the cover member passes over the hook-like ends 21 of the clips. Thereafter the ends 25 of the clips are under resilient stress and as a consequence force the turned edge 16 of the cover member toward and against a side flange of the rim part 10, as is shown in Figure 3. When it is desired to remove the cover member from the wheel, it is only necessary to insert the end of a screwdriver under the turned edge 16 and to forcibly pry it off of the spring clips. This action which takes place in the application and removal of the cover member relative to the wheel is also substantially the same in all the other forms of the invention. In other words, irrespective of whether the cover member is in the form of a disk or a ring, it is held on the wheel by reason of its contact with the spring clips which are under resilient stress due to their being deflected from their normal position when the edge of the corresponding cover member is in retained engagement therewith.

An important feature of this invention which is common to all forms as shown herein relates to the provision of a spring clip which may be mounted on the wheel by merely pressing it axially into position in the corresponding opening 14 of the wheel. In other words, all forms of the clip shown herein may be secured to the wheel without requiring any separate attaching or fastening means, so that the clips are in reality self-retained on the wheel. In all forms of the invention, with the exception of that shown in Figure 10, the spring clip is held in place by reason of it exerting a wedging or biting action against a part of the wheel. In the form of the invention shown in Figure 10, the clip is retained in place by reason of it being hooked over an inner edge at the opening 14.

More specifically, the clip 20 shown in Figure 3 is applied to the wheel by inserting it axially into the corresponding opening 14. During this application of the clip to the wheel the extremity of the forwardly inclined rear end 23 of the clip rides along the under surface of the base flange 11 of the rim part 10. Thereafter, upon a slight pull upon the hook 21 of the clip, the extremity of the clip is caused at 24 to bite into the inner surface of the flange 10, thus causing the clip to be tightly wedged between the two wheel parts 10 and 12.

In the form of the invention shown in Figure 4, the clips 30 are disposed in the wheel openings 14 in substantially the same manner as the clip 20 is mounted in the wheel shown in Figure 3. The principal difference between this form of the invention and that shown in Figure 3 relates to the cover member being in the form of two parts, namely, a trim ring 31 and a hub cap 32, and the spring clip 30 has two biting inclined legs 33—34 instead of one leg like the leg 23. In other words, the spring clip 30 in this form of the invention is in the form of a loop with overlapped and nested leg portions, the innermost extremities 33 and 34 of which are turned radially outwardly and inclined for biting cooperation with the inner surface of the base flange 11 of rim part 10. This bite increases with any tendency to accidentally dislodge the clip.

The loop portion 35 of each of the clips is adapted to yieldably embrace the outer edge of the cover part 32, as well as the inner edge of the trim ring 31, and to resiliently force the same in a direction toward the rim part in substantially the same way as the clip 20 holds the cover part 15 on the wheel. Moreover, by reason of the fact that the outer edge of the hub cap or cover part 32 overlaps the inner edge of the trim ring 31, it follows that the cover part 32 is clamped against the inner edge of the trim ring.

The application of these cover parts to the wheel and to the spring clips 35 is substantially the same as in the previously described form. The trim ring 31 is first pressed into position with its inner edge behind the loop portions 35 of the spring clips 30. Then the hub cap 32 is pressed into retained engagement with the spring clips 30—30. In order to remove the cover members, it is first necessary to remove the hub cap or central cover member 32. Thereafter, the trim ring 31 may likewise be pried loose of the wheel.

The spring clips 30 are applied to the wheel in the openings 14 in the same way as the clips 20 are mounted upon the wheel.

In the modification shown in Figure 5, the spring clips 30' are substantially like the spring clips 30, with the exception that the lapped or nested extremities 33' and 34' of the clips are slightly spaced apart by a hump 36 in one of the legs of each clip. Otherwise, the action function of these clips is substantially the same as that of clips 30.

Also, in this form of the invention, I have shown the clips as holding in place a hub cap or cover member 32' which has an underturned skirt portion 37 terminating in a turned edge 38 which is adapted to be engaged by the loop portions of the spring clips 31'. In addition thereto, the underturned skirt portion 37 of this hub cap 32' has a plurality of spaced resilient or rubber buttons 39 snapped into suitable openings in the skirt 37 and adapted to resiliently engage a side flange of the rim part 11. This provides for a cushioned engagement between the hub cap 32 and the rim part of the wheel.

In the modified form of spring clip shown in Figures 6, 7, and 8, the clip is designated generally by the reference character 40. It includes a loop portion 45 having legs extending axially inward into the openings 14 and terminating in oppositely inclined lapped ends 43 and 44 which have biting engagement with the body part 12 and the rim part 10 respectively of the wheel.

Each of the ends 43 and 44 of the legs of the clip 40 are cut on a bias as indicated at 46 and 47 respectively in Figures 7 and 8, so that the ends are in reality overlapped. By using oppositely directed ends 43 and 44, it is possible for the clip 40 to have biting or gripping engagement with both of the wheel parts 10 and 12.

In Figure 6, I have shown the clips 40 as being used to retain the central hub cap 50 in position. This hub cap has an underturned edge 51 adapted to be pressed over and into retained cooperation with the spring clips 40 in substantially the same manner as has been described in connection with previous forms of the invention.

In Figure 9, I have illustrated the same spring clips 40 as cooperating with a trim ring 52 instead of with a hub cap. In this case, the turned edge 53 of the trim ring is snapped under the clips instead of over the clips as in the case of the hub cap 50. Also, the trim ring 52 has an annularly recessed portion 54 in which the spring clips are nested as is clearly evident from Figure 9.

In Figure 10, I have shown a form of the invention wherein spring clips 60 circumferentially spaced about the wheel body part 12 are employed to retain on the wheel a trim ring 61 and a hub cap 62. Each of the spring clips 60 includes a hook-like end portion 63 similar to that of the first described form of the invention, and which retainingly engages the outer edge 64 of the hub cap 62 and the inner edge 65 of the trim ring 61. Also, each of the clips 60 includes an axially extending leg 66 which abuts the body part 12 inside of the wheel opening 14, and which terminates at the rear of the body part in the hook-like end 67 hooked over a rear edge 68 of the body part at the corresponding opening 40.

In mounting this form of clip 60 on the wheel, the leg 66 is inserted axially through the opening until its hook-like end 67 is beyond the edge 68. Then, the hook-like end 67 is hooked over the edge 68 thus locking the clip to the body part 12.

With the exception of this difference in the securement of the clips 60 to the body part of the wheel, this form of the invention operates substantially the same as the first described embodiment.

I claim as my invention:

1. In a wheel structure, a wheel including tire rim and body parts connected together at spaced intervals with spaced openings between connections, and a plurality of cover retaining spring clips at said openings, each of said spring clips being held in said openings closely by a wedged engagement with said wheel parts.

2. In a wheel structure, a wheel including tire rim and body parts connected together at spaced intervals with spaced openings between connections, a plurality of cover retaining spring clips at said openings, each of said spring clips being held in said openings solely by a wedged engagement with said wheel parts, and a wheel cover for concealing said openings and having an edge snapped over and into retained engagement with said spring clips.

3. In a wheel structure, a wheel including tire rim and body parts connected together at spaced intervals with spaced openings between connections, and a plurality of cover retaining spring clips at said openings, each of said spring clips having an inclined portion with an extremity in biting engagement with one of said parts in the corresponding opening.

4. In a wheel structure, a wheel including tire rim and body parts connected together at spaced intervals with spaced openings between connections, and a plurality of cover retaining spring clips at said openings, each of said spring clips being held in said openings solely by a wedged engagement with said wheel parts, each of said clips including a yieldable outer loop portion for cooperation with a cover member and an inner leg portion in said aforesaid wedged engagement in the corresponding wheel opening.

5. In a wheel structure, a wheel including tire rim and body parts connected together at spaced intervals with spaced openings between connections, and a plurality of cover retaining spring clips at said openings, each of said spring clips including an outer loop portion for yieldable retaining cooperation with a cover member and nested leg portions disposed inside of the corresponding wheel opening and wedged between the two parts of the cover member.

6. In a wheel structure, a wheel including tire rim and body parts connected together at spaced intervals with spaced openings between connections, and a plurality of cover retaining spring clips at said openings, each of said spring clips being held in said openings solely by a wedged engagement with said wheel parts, each of said spring clips including an outer loop portion for yieldable retaining cooperation with a cover member and nested leg portions disposed inside of the corresponding wheel opening and wedged between the two parts of the cover member, said legs including staggered inclined ends having their extremities tightly wedged against the rim part of the wheel.

GEORGE ALBERT LYON.